United States Patent [19]

Johansson

[11] Patent Number: 5,052,605
[45] Date of Patent: Oct. 1, 1991

[54] ATTACHMENT ARRANGEMENT FOR A CYCLE

[75] Inventor: Uno Johansson, Borås, Sweden

[73] Assignee: J S Products AB, Dalsjofors, Sweden

[21] Appl. No.: 465,129

[22] PCT Filed: Aug. 24, 1988

[86] PCT No.: PCT/SE88/00432
§ 371 Date: Feb. 21, 1990
§ 102(e) Date: Feb. 21, 1990

[87] PCT Pub. No.: WO89/01883
PCT Pub. Date: Mar. 9, 1989

[30] Foreign Application Priority Data

Sep. 2, 1987 [SE] Sweden ................................ 8703403

[51] Int. Cl.[5] ........................................... B60R 9/048
[52] U.S. Cl. ................................. 224/324; 224/330; 24/483; 24/535
[58] Field of Search ............... 224/42.03 B, 309, 314, 224/320, 321, 322, 323, 324, 325, 326, 330, 917; 24/270, 273, 483, 535; 248/225, 31, 316.2; 403/338, DIG. 9; 269/130, 131, 132, 228

[56] References Cited

U.S. PATENT DOCUMENTS

| | | | |
|---|---|---|---|
| 2,431,400 | 11/1947 | Iverson | 224/42.03 B |
| 2,988,253 | 6/1961 | Menghi | 224/917 X |
| 3,571,863 | 3/1971 | Logan | 24/131 C X |
| 4,024,738 | 5/1977 | Pi | 224/31 X |
| 4,396,138 | 8/1983 | Kirschner | 224/917 X |
| 4,629,104 | 12/1986 | Jacquet | 224/324 |
| 4,702,401 | 10/1987 | Graber et al. | 224/42.03 B |
| 4,705,198 | 11/1987 | Kamaya | 224/322 X |

FOREIGN PATENT DOCUMENTS

| | | | |
|---|---|---|---|
| 2431396 | 3/1980 | France | 224/917 |
| 433031 | 9/1967 | Switzerland | 224/324 |

OTHER PUBLICATIONS

Thule Brochure (Sweden), p. 11, no effective date given.
"Yakima" Brochure, p. 12, 89-90 edition.

Primary Examiner—Henry J. Recla
Assistant Examiner—Robert M. Fetsuga
Attorney, Agent, or Firm—Dvorak and Traub

[57] ABSTRACT

The present invention relates to an attachment arrangement (32,33) for a cycle which is capable of attachment in an upright attitude to a cycle supporting bar (4) capable of being connected to a vehicle-mounted load carrier (2). The attachment arrangement includes a U-shaped attachment element which straddles the side and top surface of the supporting bar. The U-shaped element includes a flexible wire which surrounds a wheel of the cycle while the wheel is received in the U-shaped recess. The flexible wire is in turn connected to a clasp and both elements are connected to the U-shaped element in an over-center arrangement.

8 Claims, 8 Drawing Sheets

ATTACHMENT ARRANGEMENT FOR A CYCLE

The present arrangement relates to an attachment arrangement for a cycle or some other similar load, which is capable of attachment in an upright attitude to a cycle supporting bar or a similar holding element capable of being connected to a vehicle-mounted load-carrier, and to U-shaped attachment elements which exhibit a recess for accommodating a cycle, etc., and are so arranged as to straddle and as to be accommodated by the cycle supporting bar, etc., in question.

One problem associated with the anchoring of loads on vehicles is that a number of different elements and devices for for fastening the load and for securing the load-carrying arrangements, etc., to the vehicle must be utilized in order for the desired function to be achieved. For example, an attachment disclosed in FR A 1,410,142 utilizes two separate straps, which are independent one from the other, for securing the load and for clamping the load-attachment elements, which makes the simple and rational handling of such arrangements more difficult.

Previously disclosed arrangements for attaching cycles and similar loads in an upright attitude to a vehicle-mounted load-carrier thus include, amongst other things, screws and wheels, etc. which are time-consuming to use and which do not easily permit adaptation to cycles, etc., of varying sizes.

The principal object of the present invention is thus, in the first place, to make available an attachment arrangement of the kind indicated which, amongst other things, solves said problem and permits rapid and simple installation and reliable supporting of loads on the roof of a vehicle of in association therewith.

Said object is achieved by means of an arrangement in accordance with the present invention, which is characterized essentially in that the cycle supporting bar and the load are so arranged as to be bridged by means of common quick-action clamping devices, which are constituted by a flexible device, one end part of which is secured to a movably supported clasp, and the opposite end of which is capable of being secured to a fastener situated on the attachment element, whereby the attachment element in question is securely clamped around the cycle support bar, etc., at the same time as the load is securely clamped to the attachment element by means of said quick-action clamping device.

The invention is described below as a number of preferred illustrative embodiments, in conjunction with which reference is made to the accompanying drawings, in which.

Figure 1:
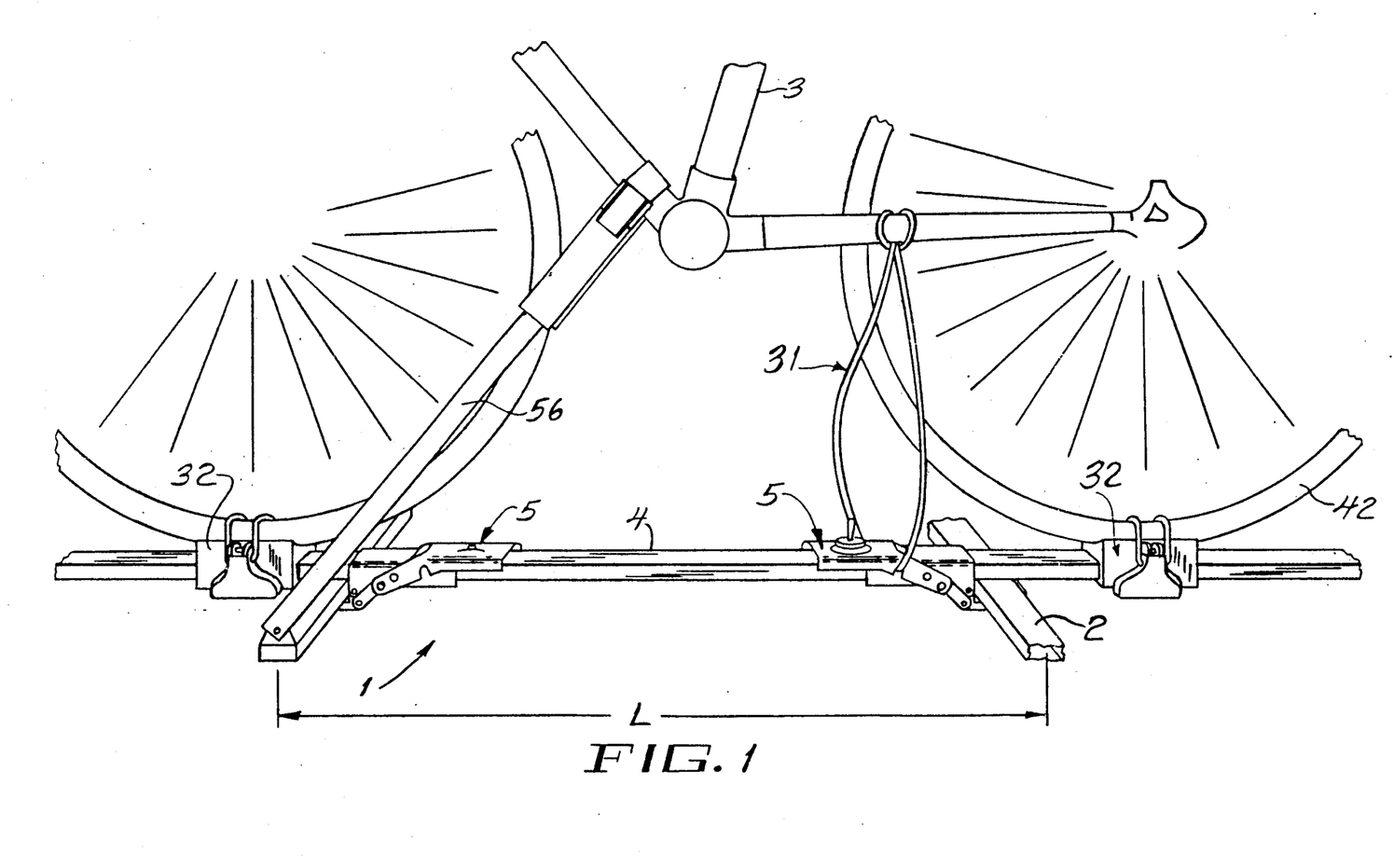
FIG. 1 shows a cycle supported on the roof of a vehicle by means of an arrangement in accordance with the invention.
Figure 2:
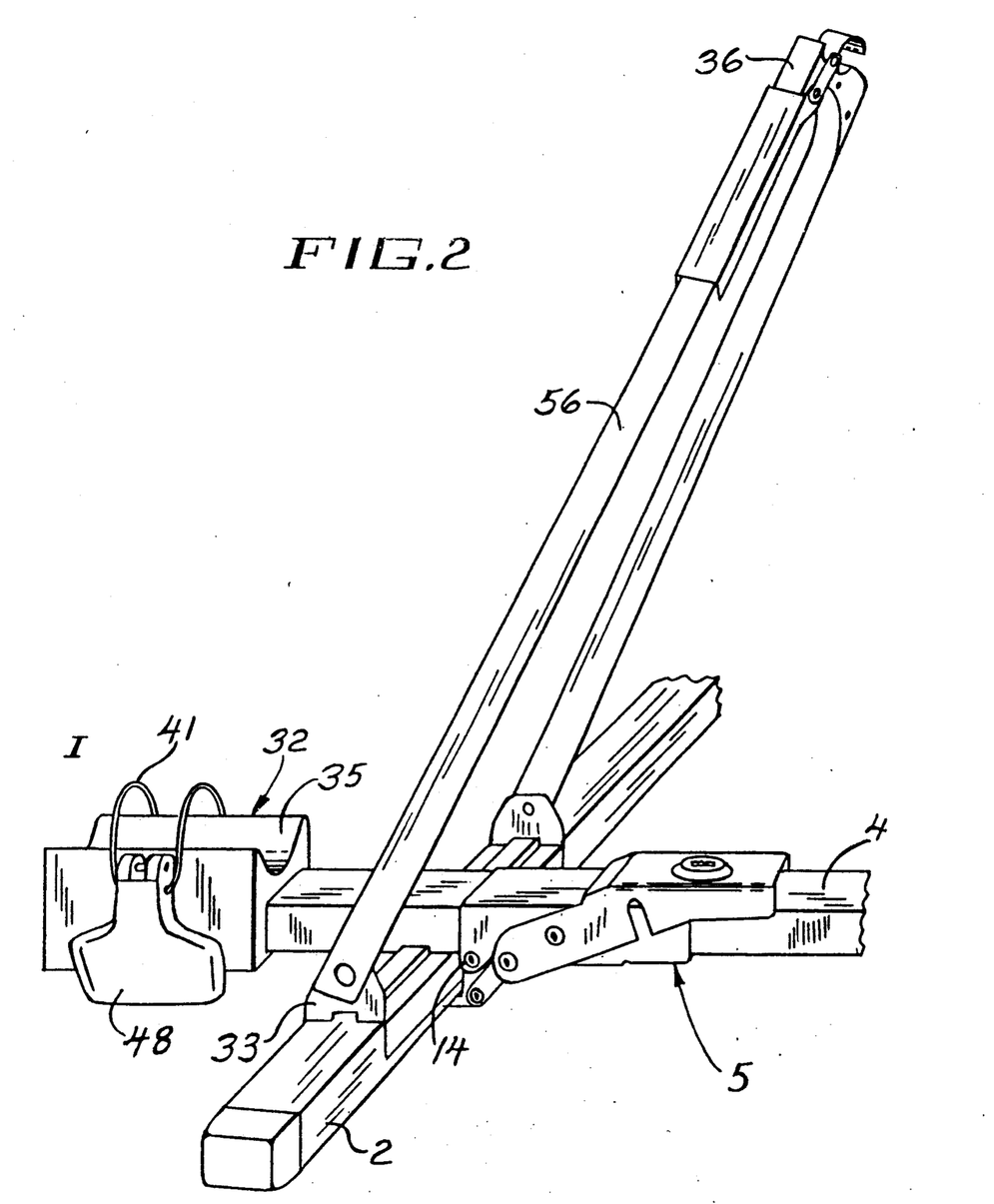
FIG. 2 is a cumulative view of the constituent parts of a cycle-holder arrangement.
Figure 3:
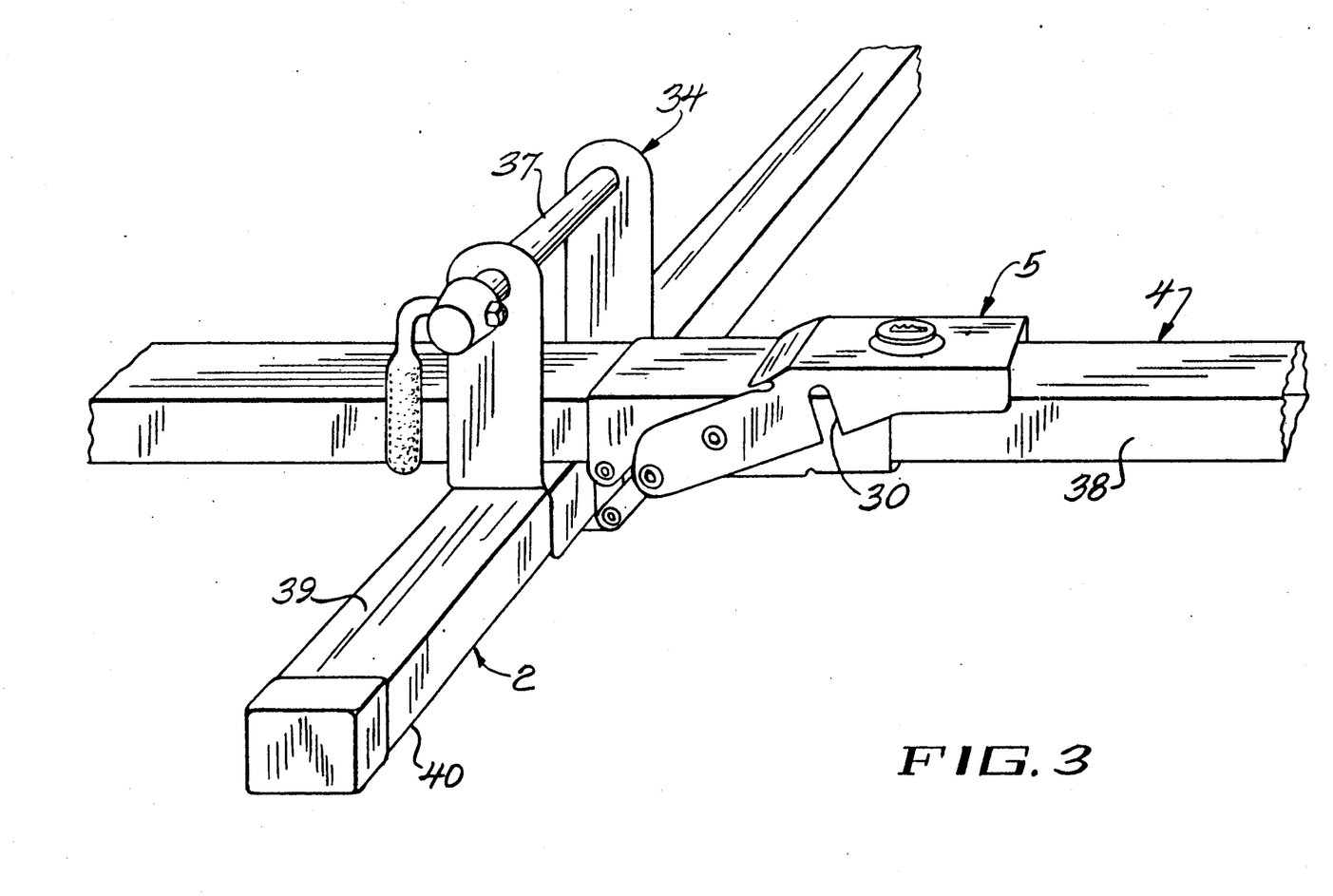
FIG. 3 shows a perspective view of a hub attachment and securing device.
Figure 4:
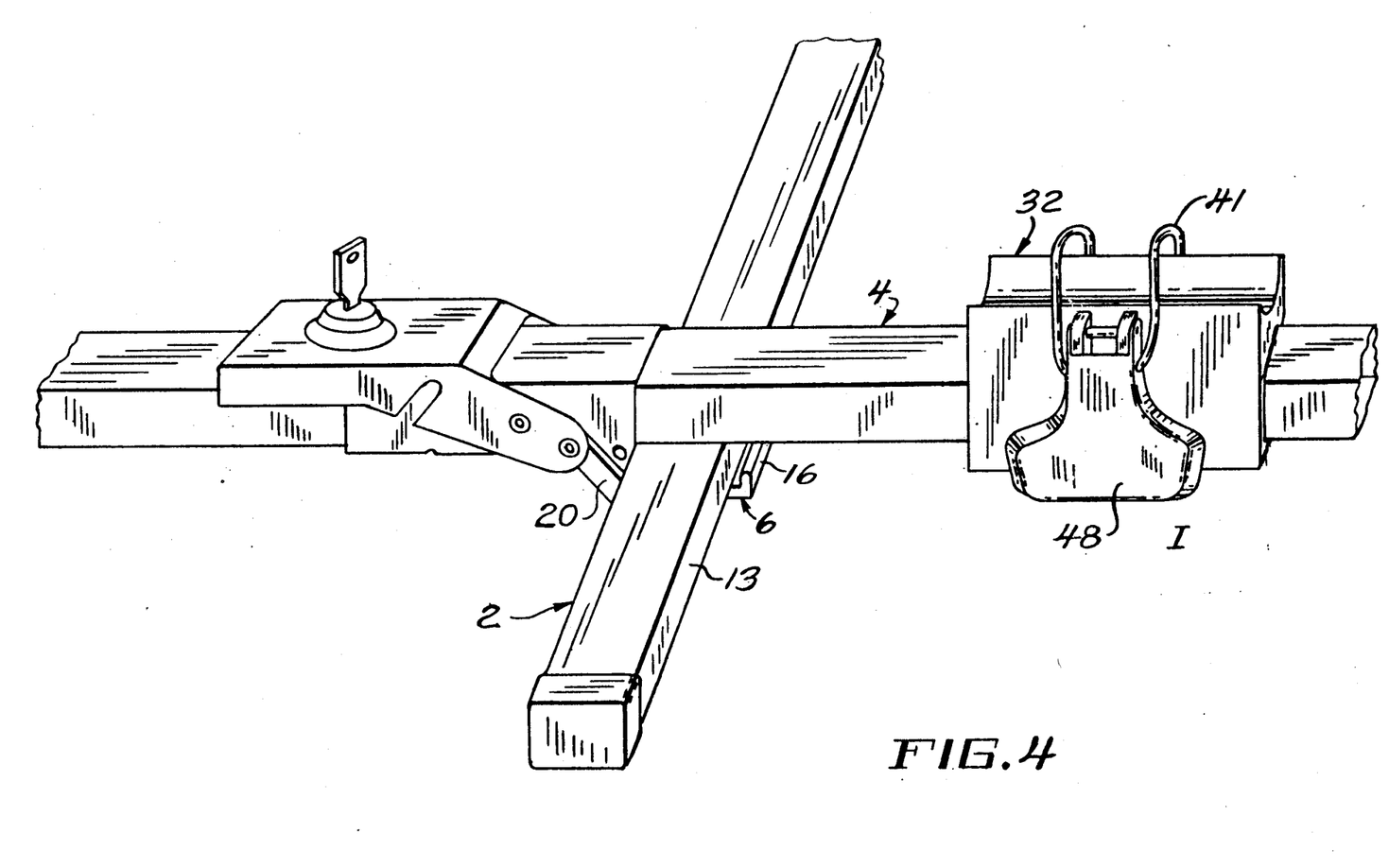
FIG. 4 shows a securing device and a wheel attachment element supported by a cycle-supporting bar.
Figure 5:
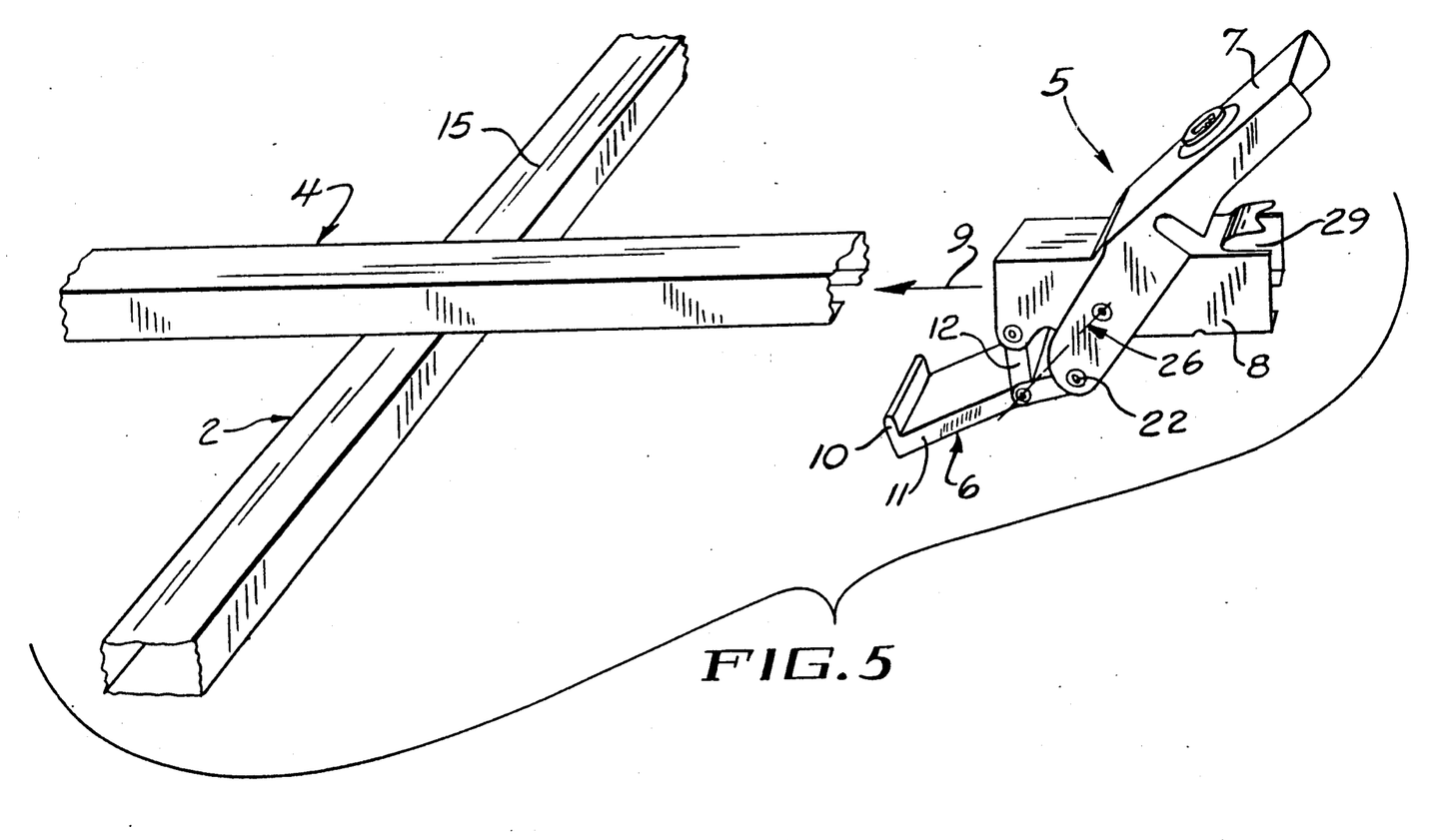
FIG. 5 shows a securing device during assembly to produce a load-carrier and a cycle supporting bar.
Figure 6:
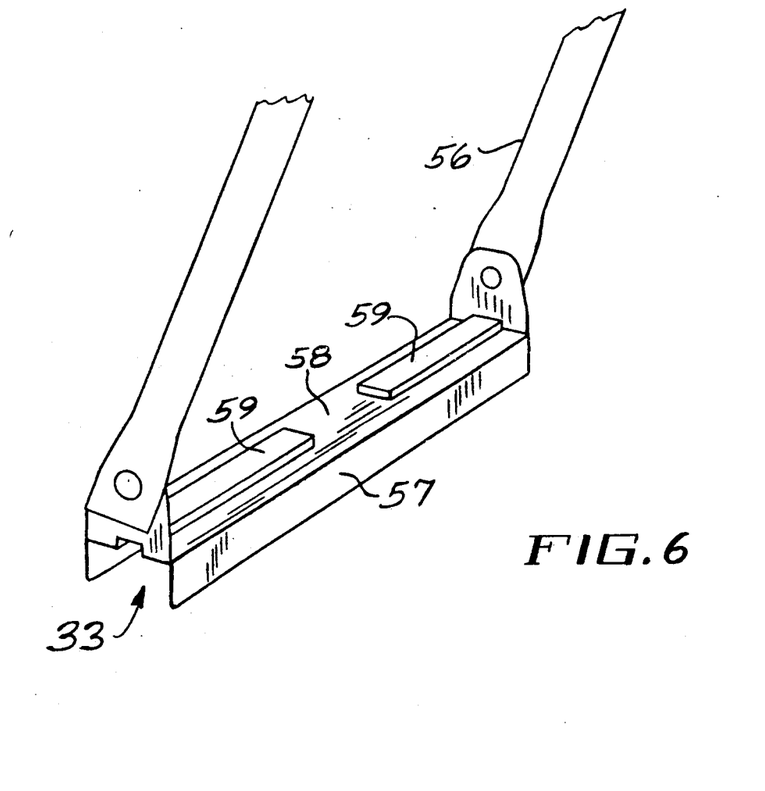
FIG. 6 shows a frame attachment.
Figure 7:
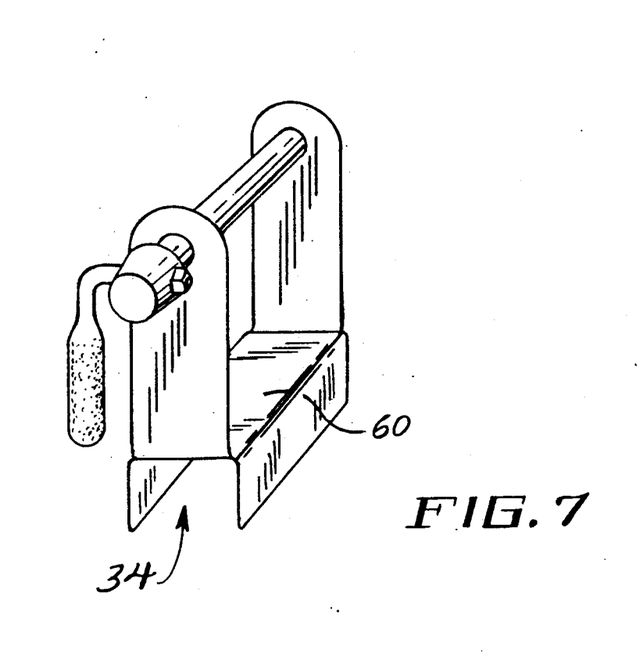
FIG. 7 shows a hub attachment.
Figures 8, 9, 10, 11:
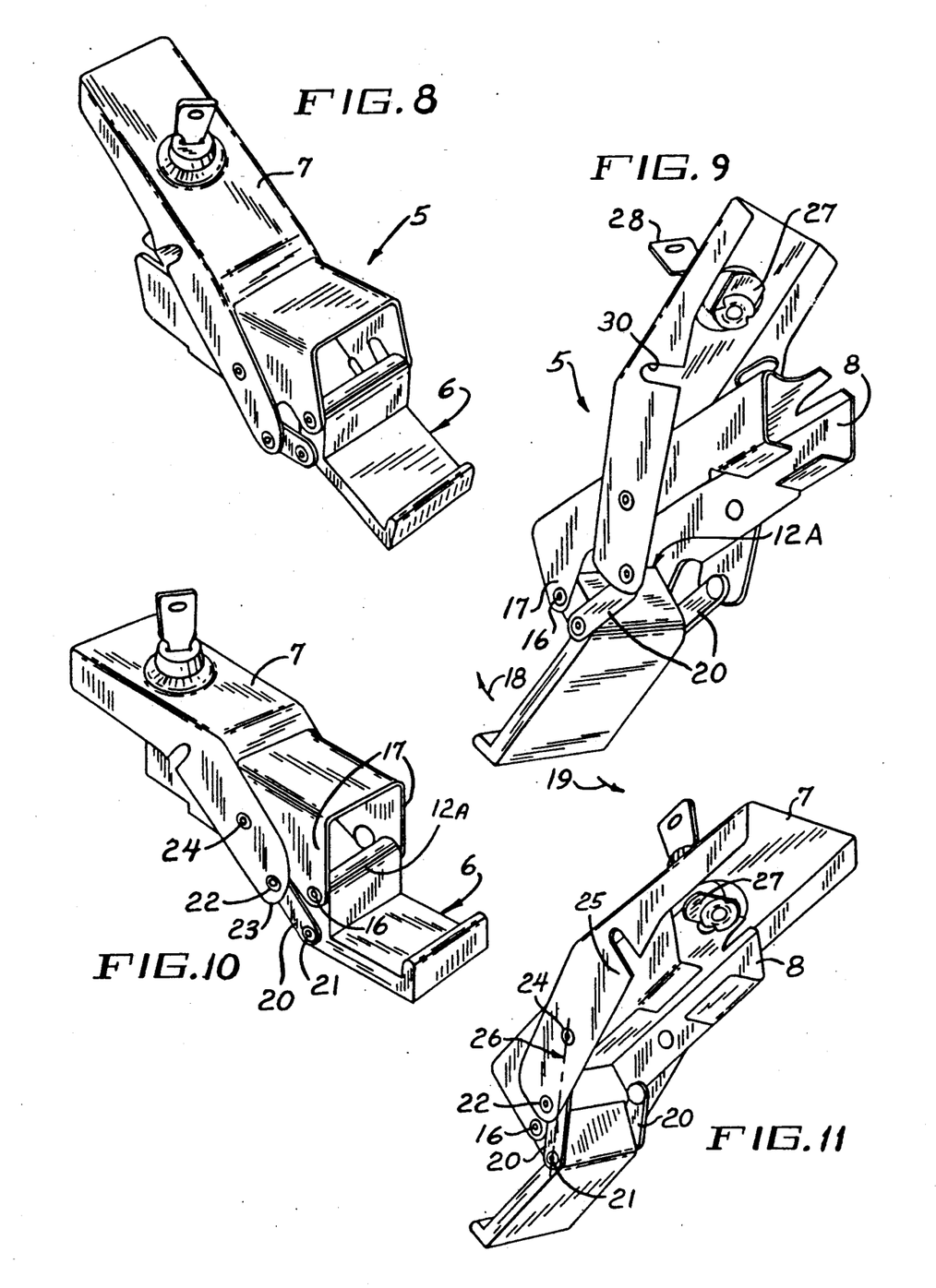
FIG. 8 shows an open securing device viewed from the front and at an angle from above.
FIG. 9 shows the open securing device viewed from the rear and at an angle from above.
FIG. 10 shows a closed securing device viewed from above.
FIG. 11 shows a closed securing device viewed from below.
Figures 12, 14:
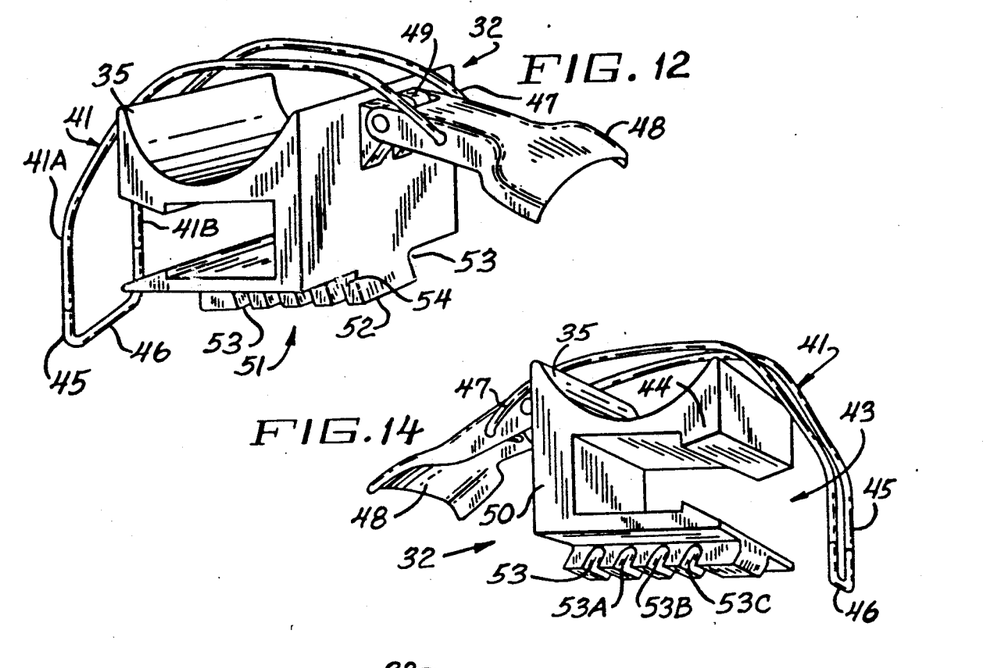
FIG. 12 shows a wheel attachment element in the open position, viewed from below.
FIG. 14 shows the wheel attachment element viewed at an angle from below in the open position.
Figure 13:
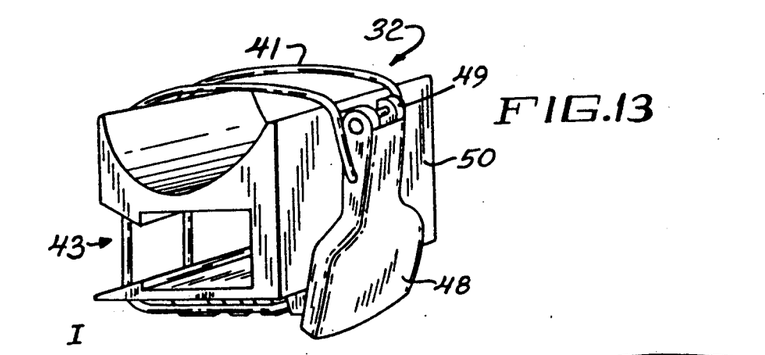
FIG. 13 shows the wheel attachment element in the closed position.
Figure 15:
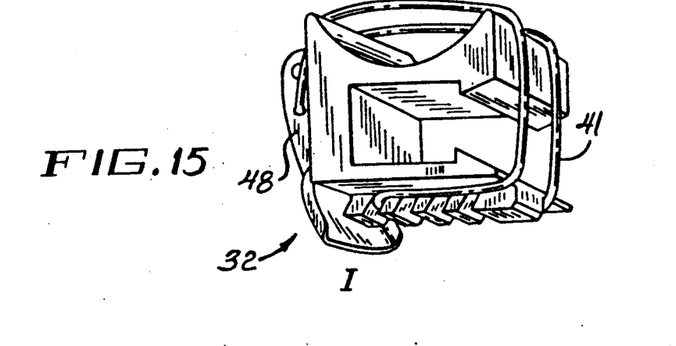
FIG. 15 shows the wheel attachment element in the closed position.

An arrangement 1 for a load-carrier 2 for cycles 3 or other similar loads, which is intended to be supported by a vehicle, with the cycles 3, etc., being capable of attachment in an upright attitude to the roof with the help of a number of cycle supporting bars 4 or similar holding elements, which are so arranged as to be capable of being connected to the load-carrier 2 in question, comprises securing devices 5 of the kind illustrated in the drawings. The load-carrier 2 and the cycle supporting bar 4 are so arranged as to be clamped together by means of such securing devices 5, for which purpose the securing devices 5 are so arranged as to straddle the cycle supporting bar 4, etc., in question and to be adjustable along same. The securing device 5 comprises a clamping arm 6, which is capable of actuation by a manually operated adjuster 7, which clamping arm and adjuster are pivotally mounted on a sleeve-shaped carrier 8 for the securing device. The securing device carrier 8 is so arranged as to be capable of being slid onto the cycle supporting bar 4, etc., in the direction of the arrow 9, as shown in FIG. 5, in order to be displaced along the bar 4 and into the desired adjustable position next to a transverse load-carrier 2, so that the clamping arm 6 can engage from below around the load-carrier 2 for the purpose of securely clamping the load-carrier 2 and the bar 4 to one another. The shape of the clamping arm 6 is appropriately adapted to the peripheral part of a load-carrier in question and exhibits a front part 10 which extends at an angle upwards from a bottom part 11, which in turn is angled in relation to an ascending holding part 12.

By means of the front part 10, which is so arranged as to interact with the wall part 13 of a load-carrier 2 along at least its lower part, an attempt is made to cause the load-carrier 2 and the securing device to move in a direction towards one another, in a relative sense.

The securing device carrier 8 appropriately exhibits a stop 14 capable of interacting with a load-carrier bar 2 of the kind in question, which stop reaches down below the upper roof part 15 of a load-carrier bar in conjunction with the fastening together of the arrangement 1.

The clamping arm 6 is pivotally mounted in the direction of the arrows 18, 19 at the upper end 12A of the holding part 12 via a bearing 16, which is accommodated in the vertical side walls 17 of the securing device carrier.

At the transition between the bottom part and the holding part 11, 12, a link 20 or some other appropriate movement-transmission device is pivotally mounted about a bearing 21 to either side of the clamping arm 6, which is also attached to the adjuster 7 via the bearing 22, which is accommodated in the outer part of the adjuster 7. The adjuster 7 is in turn pivotally mounted on the securing device carrier 8 via bearings 24 which, like the bearings 22, are similarly accommodated by vertical arm-like side walls 25 on the adjuster 7, which side walls are situated at a certain distance from one another.

The adjuster 7 is thus supported in such a way that it exhibits a so-called over-centre function, that is to say the position of the bearing 22 is varied to either side of an imaginary line 26 passing through the bearings 21, 24, with the adjuster respectively in the open and closed position.

The adjuster 7 can appropriately exhibit a locking device 27, which can be so arranged, for example through the effect of a key 28, as to be capable of interacting with a matching locking element 29 supported by the securing device 5 on its carrier 8. The locking device can be in the form of a moving tongue 27, for example, which is capable when in the locked position of being accommodated in a suitable recess 29.

The securing device 5 can also exhibit anchorage devices 30 for accommodating or in some other way interacting with a locking wire 31 or similar, by means of which a cycle 3, etc., can be attached to a load-carrier 2 and a cycle supporting bar 4 for the purpose of preventing the theft of the cycle 3, which in this way is locked to the vehicle after locking the securing device 5. The anchorage device may consist of, for example, a slot-shaped wire-accommodating opening 30, which extends through and along the end wall 25 of the securing device, so that a wire-accommodating opening is formed on the upper part of the securing device 5 between the securing device carrier 8 and the swinging arm 7 and is capable of accommodating an aforementioned endless wire loop 31, for example, after it has been passed around a cycle 3 mounted on the vehicle.

The function of the securing devices 5 should have emerged from the foregoing, and securing devices 5 can appropriately be used in pairs for the respective cycle supporting bars 4 turned in relation to one another so that the swinging arms 7 are easily accessible between the load-carrier bars 2.

No restriction, beyond the length of the cycle supporting bar, is embodied in the idea of invention, and the securing device 5 can be displaced freely in its clamped position along the cycle supporting bar 4 in order to be adapted to the actual distance L set between the load-carrier bars 2.

The attachment of a cycle 3 of some other similar load in an upright attitude to a cycle supporting bar 4 or some other similar holding element capable of being connected in a removable fashion to a load-carrier 2 supported on a vehicle can take place appropriately by means of U-shaped attachment elements 32, 33, 34, which exhibit means 35, 36, 37 for securing to a cycle, etc., 3. Attachment elements 32-34 are so arranged as to be accommodated by the cycle supporting bar, etc., 4 in question as they straddle the side 38 of the cycle supporting bar 4, etc., and/or the top 39 of the load-carrier. The remaining side 38 of the cycle supporting bar and/or the bottom 40 of the load-carrier is/are so arranged by means of quick-action clamping devices 5 and 41 as to be bridged in such a way that the attachment element 32-34 is securely clamped in a simple and effective manner around the cycle supporting bar, etc., and/or between the load-carrier 2 and the cycle supporting bar, etc., 4.

Attachment elements 32, which at their upper surface exhibit a recess 35 to accommodate the wheel 42, which attachment elements are attached to the cycle in question, are each provided with a transcurrent opening 43 in the side 44 for the purpose of accommodating an enclosing cycle supporting bar 4 introduced from the side of the cycle supporting bar, etc., 4. A preferably flexible quick-action clamping device 41 is so arranged, when in the locked position I, as to bridge said opening 43 and to engage around the aforementioned wheel 42 accommodated in the recess 35.

The quick-action clamping device, which is preferably constituted by an endless loop 41, preferably a plastic-coated wire made of metal, for example, or some other suitable material, and which exhibits at its outer part 45 a wear protector 46, which is formed into a loop, is so arranged as to be capable of being attached to the attachment element 32 at a certain distance from one another with their respective end parts 45, 47. One end part is held in a movably supported clasp 48, which is pivotally mounted via a bearing 49, which is situated on the outside of the end wall 50 situated away from the introduction opening 43, so that an over-centre effect is achieved.

The opposite end 46 of the quick-action locking device is capable of removable attachment to a locking device fastener 52 situated on the under side 51 of the attachment element at a certain distance from the clamping bearing 49. The locking device fastener is formed preferably from a number of recesses 53, 53$^A$, 53$^B$, 53$^C$ arranged in a row, in which matching recess the end 46 of the quick-action clamping device can be accommodated for securing to same after snapping the clasp 48 into engagement. Receiving channels 54, 55 extend to either side of the recesses 53-53$^C$ for the purpose of accommodating parts 41A, 41B of the quick-action clamping device.

Irrespective of the width of the wheel 42, the quick-action clamping device 41 is able to clamp it and the attachment element 32 securely by positioning the quick-action clamping device 41 in the desired recess 53-53$^C$ and locking it by means of the clasp 48.

Said quick-action clamping device 32 can easily be applied to, and released from the cycle supporting bar 4 in question, and can be displaced into the desired position along a cycle supporting bar 4 in order to be able to adapt the width between the cycle wheels 42 in the case of cycles of varying size without having to actuate knobs or screws, etc.

One attachment element 33, which is so arranged as to be capable of being attached rapidly in a removable fashion to the frame of a cycle 3 via stays 56 and securing means 36, can exhibit above its carrier 57, which is preferably of U-shaped cross-section, a receiving part 58 between two travel-restricting heels 59, so as to be capable of holding a cycle supporting bar, etc., 4 without the risk of their being displaced laterally relative to one another in the clamped position, as shown in FIG. 2.

Said part 58, as well as a clamping part 60 on the attachment element 34, are so arranged as to be clamped securely between the load-carrier 2 and the cycle supporting bar, etc., 4 through the effect of the securing device 5.

The invention is not restricted to the illustrative embodiment described above and illustrated in the drawings, but can be modified within the scope of the patent claims without departing from the idea of invention.

I claim:

1. Attachment device for mounting a cycle to a vehicle, comprising:

a vehicle-mountable load carrier,
a support bar connected to said load carrier,
a U-shaped attachment element having an accommodating recess on a top side thereof for receiving a wheel of said cycle, said attachment element being disposed on said support bar and having a transcurrent opening thereto disposed along a first side thereof and slidably receiving said support bar,
a quick action flexible clamping element arranged and constructed to fasten the wheel to said support bar,
a movable clasp pivotally connected to a second side of said attachment element opposite said first side,
a fastener disposed on a bottom side of said attachment element,
said top and bottom sides connecting said first and second sides,
said flexible clamping element having a first end secured to said movable clasp, and a second end securable to said fastener,
said clamping element arranged and constructed to surround said wheel and bridge said transcurrent opening,
said first end of said flexible element and, said movable clasp being mounted to said attaching element in an over-center locking arrangement,
whereby said attachment element and said wheel are secured with respect to said support bar by said quick action flexible clamping element.

2. Attachment device according to claim 1, wherein said second side comprises an end wall of said attachment element, wherein said movable clasp is pivotally mounted on said end wall.

3. Attachment device according to claim 2, wherein fastener comprises a plurality of recesses arranged in a row on said bottom side of said attachment element.

4. Attachment device according to claim 2, wherein said quick action flexible clamping element comprises an endless loop of plastic coated wire.

5. Attachment device according to claim 1, wherein said fastener comprises a plurality of recesses arranged in a row on said bottom side of said attachment element.

6. Attachment device according to claim 5, wherein said quick actioin flexible clamping element comprises an endless loop of plastic coated wire.

7. Attachment device according to claim 1, wherein said quick action flexible clamping element comprises an endless loop of plastic coated wire.

8. Attachment device according to claim 7, further comprising a wear protector disposed on said second end of said flexible clamping element.

* * * * *